United States Patent [19]
Issagholian-Havai et al.

[11] Patent Number: 5,378,028
[45] Date of Patent: Jan. 3, 1995

[54] APPARATUS FOR CONNECTING OVAL DUCT SECTIONS

[75] Inventors: Robert Issagholian-Havai, Tujunga; George J. Ohandjanian, Los Angeles, both of Calif.

[73] Assignee: MEZ Industries, Inc., Scottsdale, Ariz.

[21] Appl. No.: 8,683

[22] Filed: Jan. 25, 1993

[51] Int. Cl.6 .............................................. F16L 25/00
[52] U.S. Cl. .................................... 285/331; 285/424
[58] Field of Search .............. 285/177, 176, 424, 363, 285/405, 331

[56] References Cited
U.S. PATENT DOCUMENTS

| | | | |
|---|---|---|---|
| 2,498,753 | 2/1950 | Deitsch | 285/424 X |
| 4,133,566 | 1/1979 | Miller | 285/424 X |
| 5,133,580 | 7/1992 | Meinig | 285/424 X |
| 5,135,270 | 8/1992 | Arnoldt et al. | 285/363 |

FOREIGN PATENT DOCUMENTS

| | | | |
|---|---|---|---|
| 3505065 | 8/1986 | Germany | 285/424 |
| 775841 | 5/1957 | United Kingdom | 285/424 |

Primary Examiner—Dave W. Arola
Attorney, Agent, or Firm—Tod R. Nissle

[57] ABSTRACT

A flange connection for oval shaped air conditioning ducts readily adapts to ducts of differing shape and dimension. The flange is unitary and simultaneously attaches to the ends of two adjacent ducts.

3 Claims, 3 Drawing Sheets

APPARATUS FOR CONNECTING OVAL DUCT SECTIONS

This invention relates to a flange connection for air conditioning ducts.

More particularly, the invention relates to a flange connection for interconnecting a pair of generally oval shaped air conditioning ducts.

In a further respect, the invention relates to a flange connection of the type described which readily adapts to oval air ducts of differing shape and dimension.

In another respect, the invention relates to a flange connection of the type described which does not require that a first flange connection be attached to the end of one duct, that a second flange connection be attached to the end of a second duct, and that a bracket then be utilized to interconnect and press the flange connection together.

Flange connection systems for oval ducts are well known in the art. See, for example, U.S. Pat. No. 5,103,549 to Meinig et al. Such prior art systems ordinarily suffer from two disadvantages. First, the flange systems do not readily apart to oval ducts of slightly differing size, which means that the flange often will not extend completely continuously around an oval duct and that there will be a gap in the flange. This gap ruins any seal intended to be effected by the flange. Second, the flange systems require that a first flange connection be mounted on the end of a first duct and that second flange connection be mounted on the end of a second duct. The first and second flange connections must then be bolted together or otherwise interconnection to secure together the ends of the first and second ducts.

Accordingly, it would be highly desirable to provide a flange connections system for oval ducts which would readily adapt to variations in the shape and dimension of oval ducts and which would only require that a single unitary flange connection be used to interconnect the adjacent ends of a pair of oval ducts.

Therefore, it is a principal object of the invention to provide an improved flange connection system for an oval duct.

Another object of the instant invention is to provide an improved flange connection system for a pair of oval ducts which produces a continuous seal around the ends of both ducts.

A further object of the invention is to provide an improved flange connection system which only requires the use of a single unitary flange connection to attached together the adjacent ends of a pair of oval air conditioning ducts.

These and other, further and more specific objects and advantages of the invention will be apparent to those skilled in the art from the following detailed description thereof, taken in conjunction with the drawings, in which.

Figure 1:
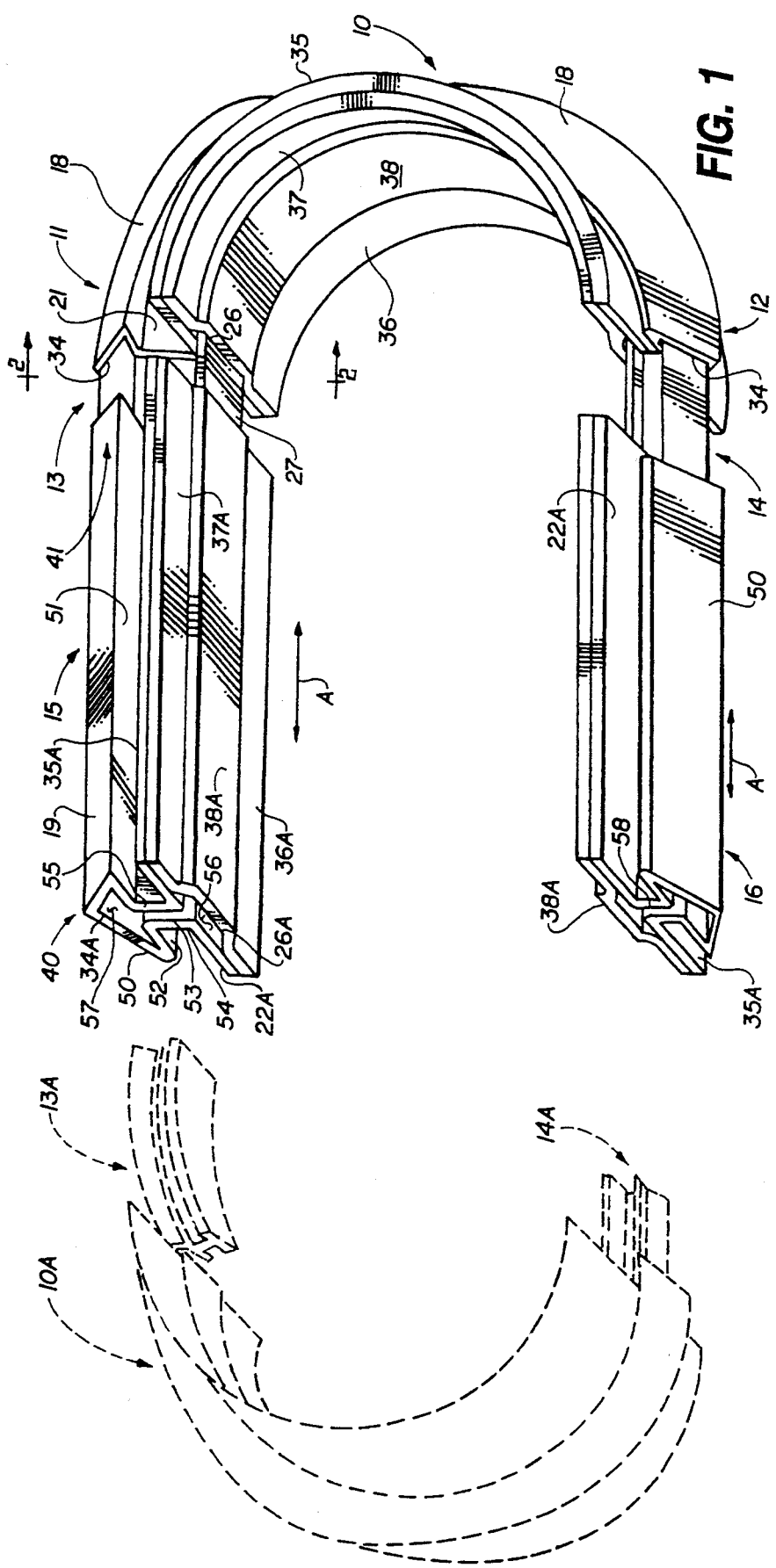
FIG. 1 is a perspective view illustrating a flange connection system constructed in accordance with principles of the invention.

Briefly, in accordance with our invention, we provide a duct joint frame for connecting the end portion of a pair of generally oval ducts. The frame includes first and second frame members each arranged to be simultaneously secured to flat planar portions of each of the pair of oval ducts. Each of the first and second frame members includes first and second spaced apart stays (51,35A) defining a first elongate opening for receiving a linear edge of one of the pair of oval ducts; third and fourth spaced apart stays (52, 22A) defining a second elongate opening for receiving a linear edge of the other of the pair of oval ducts; and, a housing (34, 70) defining an elongate sleeve means generally parallel to the first and second elongate openings and to the edges of the oval ducts inserted in the first and second openings. The duct frame also includes third and fourth frame members each arranged to be simultaneously secured to curved planar portions of each of the pair of oval ducts. The third and fourth frame members each include first and second spaced apart stays (72, 35) defining a first elongate opening for receiving an arcuate edge of one of the pair of oval ducts; third and fourth spaced apart stays (71, 22) defining a second elongate opening for receiving an arcuate edge of the other of the pair of oval ducts, and, an elongate arm (13) arranged to slidably engage the housing to permit the distance between the stays of the first and second frame members with respect to the stays of the third and fourth frame members to be adjusted. The elongate arm includes a first pair of spaced apart stays (25, 27) defining a elongate opening for receiving an edge of one of the pair of oval ducts; a second pair of spaced apart stays (24, 27) defining a elongate opening for receiving an edge of the other of the pair of oval ducts.

Figure 2:
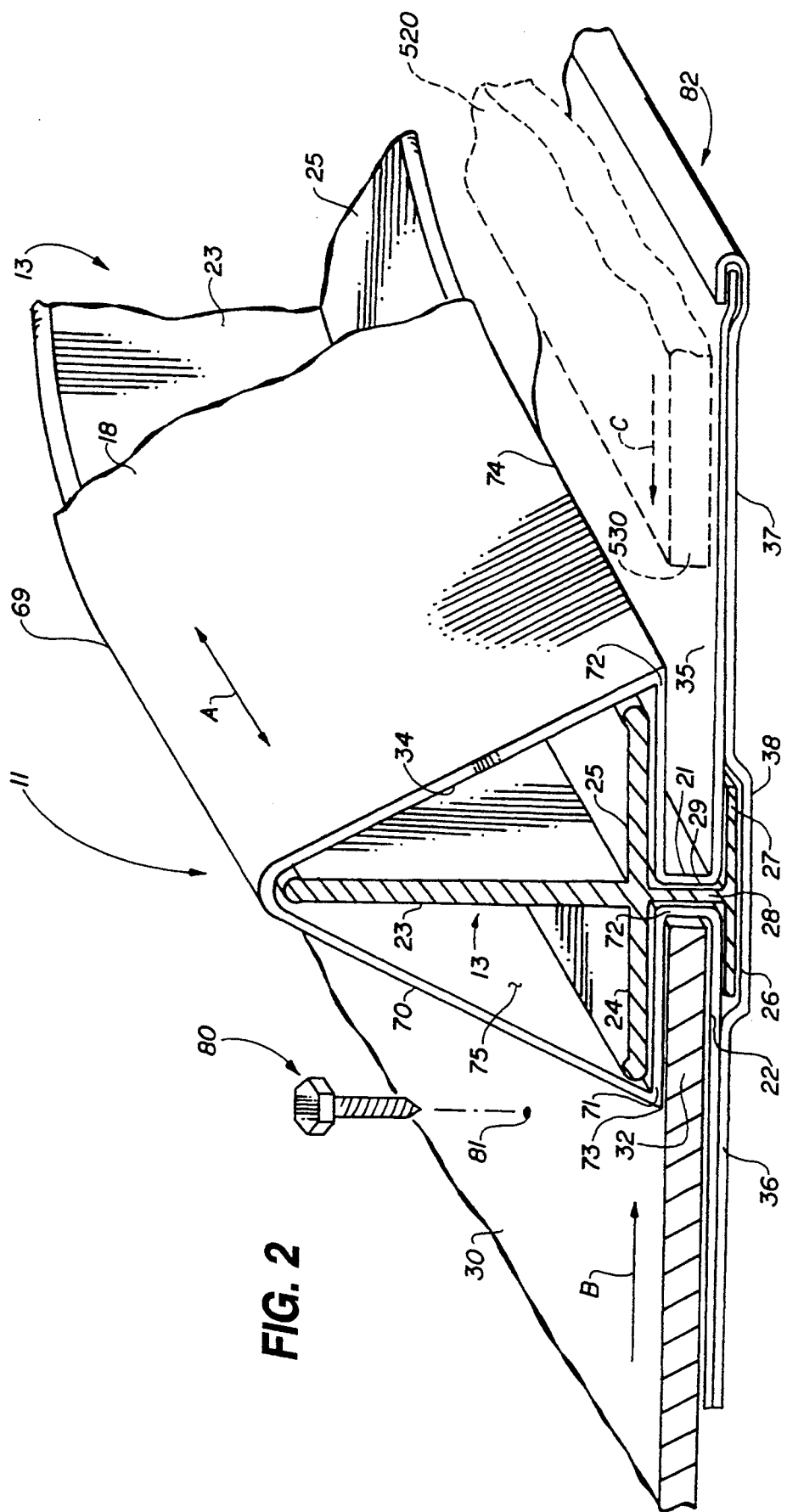
FIG. 2 is perspective view of a portion of the flange connection system of FIG. 1 illustrating further construction details thereof; and, FIG. 3 is a perspective view illustrating a pair of oval ducts of the type interconnected with the flange connection system of FIGS. 1 and 2.
Figure 3:
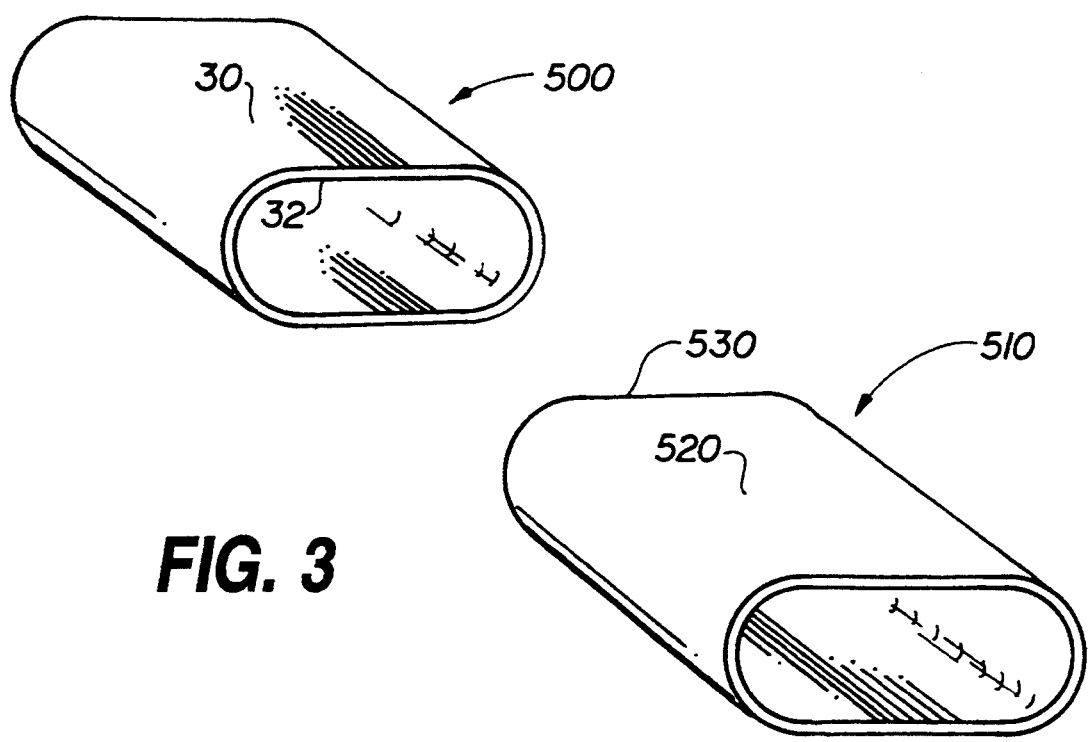

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate an adjustable flange assembly for interconnecting a pair of oval duct members 500 and 510 illustrated in FIG. 3. Duct member 500 includes a wall 30 and an oval end edge 32. Duct member 510 includes a wall 520 and an oval end edge 530. The flange assembly includes a pair of identical arcuate flange units 10 and 10A, a pair of identical linear or straight flange units 15 and 16, and four identical bridging flange units 13, 14, 13A, and 14A.

Flange unit 15 includes a U-shaped panel having elongate panel members 36A, 37A, and 38A. Housing member 40 includes sloped stays 19 and 50. Stay 19 runs into stay 51. Stay 51, after a ninety degree bend, runs into stay 55. Stay 55, after a ninety degree bend, runs into stay 35A. Stay 50 runs into stay 52. Stay 52, after a ninety degree bend, runs into stay 54. Stay 54, after a ninety degree bend, runs into stay 22A. Panel member 36A is connected to stay 22A. Panel member 37A is connected to stay 35A. Stays 22A, 35A and panels 36A, 37A, 38A, each bound and define, at least in part, elongate rectangular opening 56. Stays 53 and 55 bound and define an elongate rectangular opening 58 which is normal to opening 56. Stays 19, 50, 51, 52 each bound and define, at least in part, elongate triangular opening 57. As shown in FIGS. 1 and 2, one end of each bridging unit 13, 14, 13A, 14A is straight while the other end is arcuate. Openings 56, 57 and 58 slidably receive the linear end of a bridging flange unit 13A.

Each bridging flange units 13, 14, 13A, 14A includes an elongate panel or foot 27. Elongate panel or neck 28 interconnects foot 27 and elongate panels or arms 24, 25. Elongate panel or head 23 is connected to arms 24 and 25. Arms 24, 25 are parallel to foot 27. Neck and head 23 are collinear and perpendicular to arms 24 and 25. Arms 24, 25 and head 13 are, in the linear or straight portion of each bridging unit 13, 14, 12A, 14A, shaped and dimensioned to be slidably received by opening 57 in a flange unit 15, 16. Arms 24, 25 and head 23 are, in the arcuate portion of each bridging unit 13, 14, 13A, 14A, shaped and dimensioned to be received by a triangular opening 34 in an arcuate flange unit 10 or 10A.

As illustrated in FIG. 2, arcuate flange unit 10 includes ends 11 and 12. Sloped stay 18, after bend 69, runs into stay 70. Stay 70, after bend 73, runs into stay 71. Stay 71, after a ninety degree bend, runs into narrow cross stay 72. Stay 72, after a ninety degree bend, runs into stay 22. Sloped stay 18, after bend 74, runs into stay 72. Stay 72, after a ninety degree bend, runs into narrow cross stay 21. Stay 21, after a ninety degree bend, runs into stay 35. Panels 36 and 37 are connected to stays 22 and 35, respectively, and are connected and parallel to elongate panel 38. Panels 36, 37, 38 and stays 22 and 25 collectively each partially bound and define elongate aperture or opening 26. Opening 26 in each end 11 and 12 fixedly receives and houses the arcuate end of foot 27 of a bridging flange unit 13. The opening bounded by stays 21, 72 in each end 11, 12 of unit 10 fixedly receives and houses the arcuate end of neck 28 of a bridging flange unit 13. The triangular opening 75 bounded and defined by stays 18, 70, 71, and 72 fixedly receives and house the arcuate end of head 23 and arms 24, 25 of a bridging flange unit 13.

In use, the arcuate ends of each bridging flange unit 13, 14, 13A, 14A are fixedly secured in the openings 75 and 26 in the end of one of flange units 10, 10A, 15, 16. In FIG. 1, for example, the arcuate end of flange unit 14A is fixedly secured in one end of flange unit 10A such that the portion of unite 14A extending outwardly from unit 10A is straight. After the arcuate ends of flange units 13 and 13A are each secured in one of the openings 75 and 25 in ends 11 of units 10 and 10A, respectively, the straight portions of units 13 and 13A which extend outwardly from units 10 and 10A are slidably inserted in openings 57 and 56 of unit 15. Similarly, after the arcuate ends of flange units 14 and 14A are each secured in the openings 75 and 25 in one end 12 of units 10 and 10A, respectively, the straight portion of units 13 and 13A which extend outwardly from units 10 and 10A are slidably inserted in openings 57 and 56 of unit 15. The position of units 15 and 16 with respect to units 10 and 10A is adjusted by sliding units 15 and 16 along the straight portion of a bridging unit 13, 13A, 14, 14A. The oval end edges 530 and 32 of a pair of adjacent oval ducts are inserted (FIG. 2) in the elongate U-shaped openings defined by stays 72, 21, 35 and by stays 71, 72, 22. If desired, tar or some other sealant material can be utilized in the elongate U-shaped openings to seal edges 530 and 32 in the U-shaped openings. In FIG. 2 edge 32 has been inserted in the U-shaped opening bounded by stays 71, 72, and 22 by displacing edge 32 in the direction of arrow B. Edge 530 is inserted in the U-shaped opening bounded by stays 72, 21, 35 by displacing edge 530 in the direction of arrow C. If necessary, before edges 32 and 530 are inserted in the flange assembly of FIG. 1, units 15 and 16 are slid along bridging units 13, 14, 13A, and 14A such that the U-shaped openings in the flange assembly conform to and fit edges 32 and 530. A principal advantage of the apparatus of the invention is that the grooves in the flange assembly of FIG. 1 which receive edges 32 and 530 can be formed to closely and snugly fit over edges 32 and 530. This is possible because the units 15 and 16 of the assembly of FIG. 1 can be slid along bridging units 13, 14, 13A, 14A to custom fit the flange assembly to the edge of an oval duct 500, 510.

Self drilling screws 80 can be turned into and through contact points 81 on duct walls 30 and 520 and through members 30 and 500 and through stay pairs 32–36 and 35–37 to secure the ducts 500 and 510 to arcuate flange unit 10, or, if appropriate to flange units 10A, 15, and 16.

As shown in FIG. 2, the outer edge of one 37 of an adjacent pair of stays 35–37 can, if desired, be curled and secured over the outer edge of the other 35 of the stay pair 35–37.

Having described our invention in such terms as to enable those skilled in the art to understand and practice it, and having identified the presently preferred embodiments thereof,

We claim:

1. A duct joint frame for connecting the end portion of a pair of generally oval ducts, comprising
   (a) first and second frame members (15, 16) each arranged to be simultaneously secured to flat planar portions of each of the pair of oval ducts, each of said frame members including
      (i) first and second spaced apart stays (51, 35A) defining a first elongate opening for receiving a linear edge of one of the pair of oval ducts,
      (ii) third and fourth spaced apart stays (52, 22A) defining a second elongate opening for receiving a linear edge of the other of the pair of oval ducts,
      (iii) a first housing (19, 50) attached to said first and third stays and defining an elongate sleeve means generally parallel to said first and second elongate openings and to the edges of the oval ducts inserted in said first and second openings;
   (b) third and fourth frame members (10, 10A) each arranged to be simultaneously secured to curved planar portions of each of the pair of oval ducts, each of said frame members including
      (i) fifth and sixth spaced apart stays (72, 35) defining a third elongate opening for receiving an arcuate edge of one of the pair of oval ducts,
      (ii) seventh and eighth spaced apart stays (71, 22) defining a fourth elongate opening for receiving an arcuate edge of the other of the pair of oval ducts,
      (iii) a second housing (34, 70) attached to said fifth and seventh stays and defining an elongate sleeve means generally parallel to said third and fourth elongate openings and to the edges of the oval ducts inserted in said third and fourth openings,
      (iv) an elongate arm (13) fixedly engaging said elongate sleeve means of said second housing and extending outwardly from said second housing to slidably engage said elongate sleeve means of said first housing to permit the distance between said stays of said first and second frame members with respect to said stays of said third and fourth frame members to be adjusted, said elongate arm including
         a first pair of spaced apart stays (25, 27) defining an elongate opening for receiving an edge of one of the pair of oval ducts, and a second pair of spaced apart stays (24, 27) defining an elongate opening for receiving an edge of the other of the pair of oval ducts, said first and second pairs of stays of said elongate arm slidably engaging selected ones of said stays of one of said first and second frame members.

2. A duct joint frame for connecting the end portion of a pair of generally oval ducts, comprising
(a) first and second frame members (15, 16) each arranged to be simultaneously secured to flat planar portions of each of the pair of oval ducts, each of said frame members including
  (i) first and second spaced apart stays (51, 35A) defining a first elongate opening for receiving a linear edge of one of the pair of oval ducts,
  (ii) third and fourth spaced apart stays (52, 22A) defining a second elongate opening for receiving a linear edge of the other of the pair of oval ducts,
  (iii) a first housing (19, 50) attached to said first and third stays and defining an elongate sleeve means generally parallel to said first and second elongate openings and to the edges of the oval ducts inserted in said first and second openings;
  (iv) a second housing (38A) attached to said second and fourth stays and defining an elongate sleeve means generally parallel to said first and second elongate openings and to the edges of the oval ducts inserted in said first and second openings;
(b) third and fourth frame members (10, 10A) each arranged to be simultaneously secured to curved planar portions of each of the pair of oval ducts, each of said frame members including
  (i) fifth and sixth spaced apart stays (72, 35) defining a third elongate opening for receiving an arcuate edge of one of the pair of oval ducts,
  (ii) seventh and eighth spaced apart stays (71, 22) defining a fourth elongate opening for receiving an arcuate edge of the other of the pair of oval ducts,
  (iii) a third housing (34, 70) attached to said fifth and seventh stays and defining an elongate sleeve means generally parallel to said third and fourth elongate openings and to the edges of the oval ducts inserted in said third and fourth openings,
  (iv) an elongate arm (13) engaging said elongate sleeve means of said third housing and extending outwardly from said third housing to slidably engage said elongate sleeve means of said first and second housings to permit the distance between said stays of said first and second frame members with respect to said stays of said third and fourth frame members to be adjusted, said elongate arm including
    a first pair of spaced apart stays (25, 27) defining an elongate opening for receiving an edge of one of the pair of oval ducts, and a second pair of spaced apart stays (24, 27) defining an elongate opening for receiving an edge of the other of the pair of oval ducts, said first pair of stays of said elongate arm slidably engaging said first housing of one of said first and second frame members, and said second pair of stays of said elongate arm slidably engaging said second housing of one of said first and second frame members.

3. A duct joint frame for connecting the end portion of a pair of generally oval ducts, comprising
(a) first and second frame members (15, 16) each arranged to be simultaneously secured to flat planar portions of each of the pair of oval ducts, each of said frame members including
  (i) first and second stays (22A, 35A),
  (ii) first housing means connected to said first and second stays and including third and fourth stays (52, 51) and members (19, 50) defining an elongate sleeve means, said first and third stays (22A, 52) being spaced apart and defining a first elongate opening for receiving a linear edge of one of the pair of oval ducts, said second and fourth stays (35A, 51) being spaced apart and defining a second elongate opening for receiving a linear edge of one of the pair of oval ducts,
(b) third and fourth frame members (10, 10A) each arranged to be simultaneously secured to curved planar portions of each of the pair of oval ducts, each of said frame members including
  (i) fifth and sixth stays (22, 35),
  (ii) second housing means connected to said fifth and sixth stays and including seventh and eighth (71, 72) stays and members (34, 70) defining an elongate sleeve means, said fifth and seventh stays (22, 71) being spaced apart and defining a third elongate opening for receiving a linear edge of one of the pair of oval ducts, said sixth and eighth stays (35, 72) being spaced apart and defining a fourth elongate opening for receiving a linear edge of one of the pair of oval ducts,
  (iii) an elongate arm (13) engaging said second housing means and extending outwardly from said second housing means to slidably engage said first housing means to permit the distance between said stays of said first and second frame members with respect to said stays of said third and fourth frame members to be adjusted, said elongate arm including
    a first pair of spaced apart stays (25, 27) defining an elongate opening for receiving an edge of one of the pair of oval ducts, and a second pair of spaced apart stays (24, 27) defining an elongate opening for receiving an edge of the other of the pair of oval ducts, said first and second pair of stays of said elongate arm slidably engaging said first housing of one of said first and second frame members.

* * * * *